United States Patent [19]

Isogai

[11] Patent Number: 4,825,977

[45] Date of Patent: May 2, 1989

[54] SYSTEM FOR LIFTING AN AUTOMOBILE FOR REPAIR THEREOF, HAVING A DEVICE FOR FIXING SWING ARMS IN HORIZONTAL POSITIONS

[75] Inventor: Shunji Isogai, Hekinan, Japan

[73] Assignee: Sugiyasu Industries Co., Ltd., Aichi, Japan

[21] Appl. No.: 132,986

[22] Filed: Dec. 15, 1987

[30] Foreign Application Priority Data

Nov. 10, 1987 [JP] Japan ................................ 62-171915

[51] Int. Cl.[4] .............................................. B60S 13/00

[52] U.S. Cl. .................................. 187/8.47; 187/8.75; 254/89 R

[58] Field of Search .................... 187/8.41, 8.47, 8.64, 187/8.59, 8.45, 8.54, 8.5, 8.75; 254/89 R, 134; 248/419, 425, 352

[56] References Cited

U.S. PATENT DOCUMENTS 4,031,982 6/1977 Lindfors ............................ 187/8.59
4,715,477 12/1987 Suzuki ............................... 187/8.47

*Primary Examiner*—Joseph J. Rolla
*Assistant Examiner*—Kenneth Noland
*Attorney, Agent, or Firm*—Lahive & Cockfield

[57] ABSTRACT

A system for lifting an automobile for repair thereof includes a pair of opposed posts. Each post is provided with a vertically movable carriage having arms installing section which projects in a direction parallel to the direction from which an automobile is driven into the system. A pair of swing arms are pivotally connected, at their inner ends, to each installing section. A lock gear is connected to the inner end of each arm. A disk normally engages the gear to fix the arms in their horizontal positions. The disk is connected to a vertical rod extending through a mount connected to the installing section. The rod is vertically movable. When the carriage is lowered and the rod comes into contact with a floor, the arms are unfixed.

2 Claims, 3 Drawing Sheets

SYSTEM FOR LIFTING AN AUTOMOBILE FOR REPAIR THEREOF, HAVING A DEVICE FOR FIXING SWING ARMS IN HORIZONTAL POSITIONS

FIELD OF THE INVENTION

This invention relates to a two-post type system for lifting an automobile for repair thereof which has a device for fixing swing arms in horizontal positions.

BACKGROUND OF THE INVENTION

One of such conventional systems has the following construction: A pair of opposed posts with horizontal rectangular cross sections each have a vertically movable carriage connected thereto for vertical movement. The carriage is provided with an arms installing section. The installing section of each carriage projects toward the installing section of the other carriage. In other words, the installing sections are located on the respective opposed sides of the two posts. A pair of horizontal swing arms are connected, at their inner ends, to vertical pivots provided at opposed ends of each installing section. A lock gear is connected to the inner end of each swing arm. The lock gear has an arcuate toothed wall which is concentric with the pivot installing the arm. A common vertical rod is provided in conjunction with the lock gears connected to the two arms. The vertical rod is connected to the carriage, and is vertically movable. The swing arms are unfixed, in their horizontal positions, by the vertical rod coming into contact with a base. The lock gear and the vertical rod are connected to each other, by means of a link, on an upper surface of the installing section.

In such a conventional construction, since the arms installing sections project toward each other and the links are exposed on the upper surfaces of the installing sections, these sections and the links may prevent doors of an automobile lifted by the arms from being opened wide for repair of the inside of the automobile. Also, since the link is located straight between the inner ends of the arms, a lever for manually unfixing the arms must be connected to the link at the central portion of the arms installing section. Thus, it is not easy to operate the lever.

SUMMARY OF THE INVENTION

The primary object of the invention is to provide a lift system of the foregoing character which is free from the foregoing disadvantages of the conventional systems.

DETAILED DESCRIPTION OF THE PREFERRED EMBODIMENT

Figure 1:
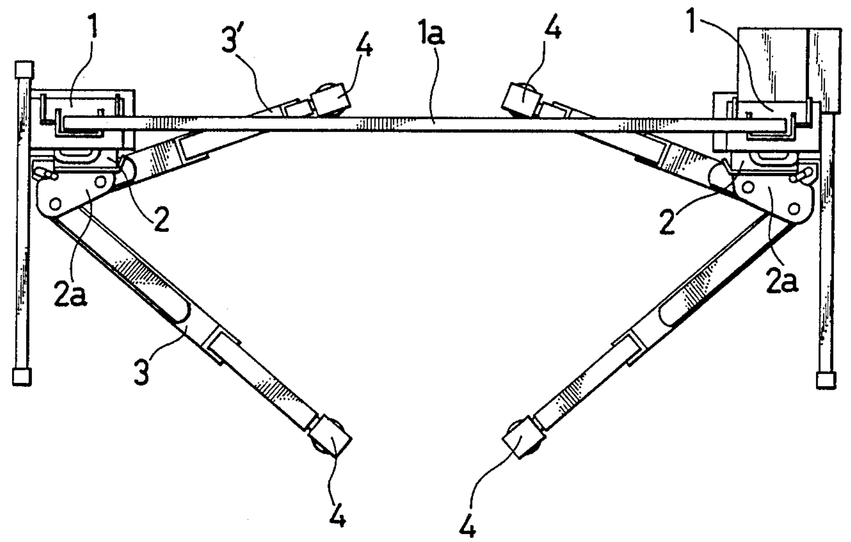
FIG. 1 is a plan view of a lift system according to the invention.

Referring now to the drawings, a system for lifting an automobile for repair thereof includes a pair of posts 1 and 1 having opposed sides. Each post 1 has an inner space which is open in a direction parallel to the direction from which an automobile is driven into the system. Also, each post 1 has a horizontal rectangular cross section. A vertically movable carriage 2 is provided in the inner space of the post 1. The larger part of the carriage 2 is located within the inner space of the post, and the remaining portion thereof is exposed to the outside. The carriage 2 is provided with an arms installing section 2*a* comprising a pair of parallel, upper and lower horizontal plates which project in the direction parallel to the direction from which an automobile is driven into the system. A pair of telescopic swing arms 3 and 3′ are connected, at inner ends thereof, to pivots extending vertically in the installing section 2*a*. The arms 3 and 3′ thus may be swung in a horizontal plane. As shown in FIG. 1, the arm 3′ is shorter than the arm 3. Each arm has a car support means 4 at its outer end. The two posts 1 and 1 are connected, at their tops, to each other by means of a horizontal member 1*a*.

A lock gear 5 is connected to the inner end of each swing arm. The lock gear 5 has an arcuate toothed wall which is concentric with the pivot installing the arm. In conjunction with the lock gear 5, a horizontal rod 10 extends through and is supported by a bearing 6*a*. The rod 10 is movable toward or away from the lock gear 5. A disk or cylinder 6 is connected to one end of the rod 10. The disk 6 has a toothed surface which is adapted to engage the toothed wall of the gear 5. Also, the disk 6 has an axis which makes right angles with a surface tangent to the arc of the toothed wall of the gear 5 when the disk is in engagement with the wall thereof.

If desired, the lock gear 5 may be omitted, and instead an arcuate toothed surface may be formed directly on the inner end of the swing arm in such a manner that the surface is concentric with the pivot installing the arm.

Figure 2:
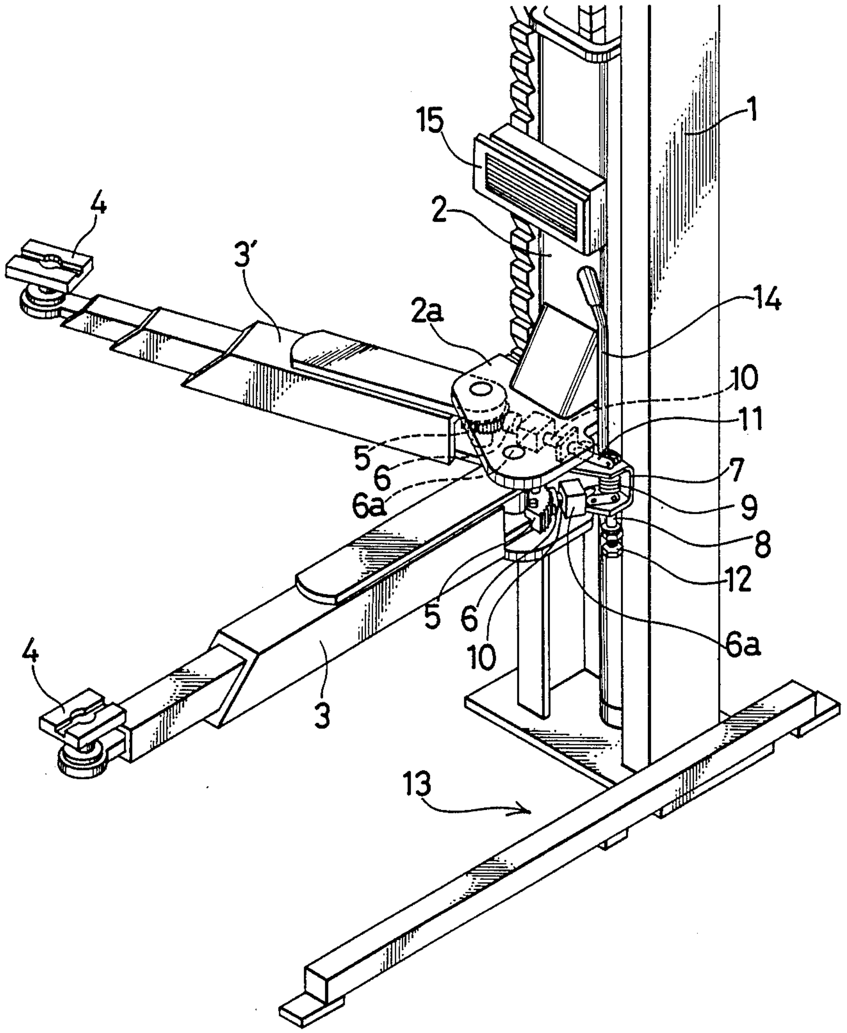
In FIG. 2, swing arms of the system of FIG. 1 are in lifted positions and are fixed in their horizontal positions; and In FIG. 3, the swing arms are in lowered positions and unfixed.
Figure 3:
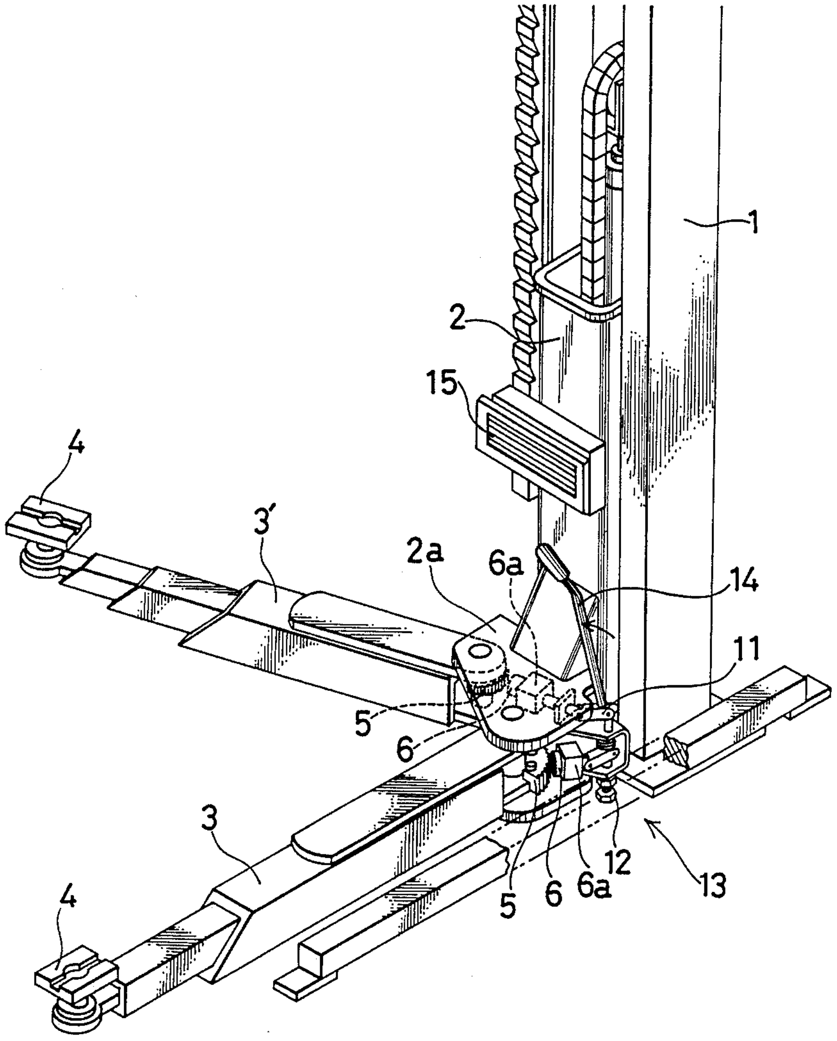

By the side of the arms installing section 2*a*, a vertical rod 8 extends through a generally U-shaped mount 7 which is connected to the section 2*a*. The rod 8 is vertically movable relative to the mount 7. A coil spring 9 is fitted around the portion of the rod 8 located in the mount 7, and urges the rod 8 in a downward direction. The horizontal rods 10 for the respective arms 3 and 3′ are connected to the vertical rod 8 at ends thereof opposed to their ends having the disks 6 and by means of links 11. However, the rod 10 for the arm 3 is connected thereto in the mount 7, while the rod 10 for the 3′ is connected to the portion of the rod 8 projecting from the mount 7, or the top of the rod 8. Also, the lock gear 5 for the arm 3′ is located in a higher position than the lock gear 5 for the arm 3. A bolt 12 is connected to the lower end of the vertical rod 8. The length of the bolt 12 from the lower end of the rod 8 may be adjusted. When the bolt 12 of the rod 8 is not in contact with any object, the toothed surfaces of the disks 6 are in engagement with the toothed walls of the respective lock gears 5 (FIG. 2). The bolt 12 of the rod 8 comes into contact with a floor 13 immediately before the carriage 2 reaches its lowest position. The horizontal rods 10 for the arms 3 and 3′ and the links 11 therefor, as a whole, generally form the alphabetical letter "V" when viewed from above. A lever 14 is secured to the upper link 11. When the lever 14 is inclined in a direction indicated by an arrow of FIG. 3, the side of the upper link 11 connected to the vertical rod 8 is lifted to raise the rod 8 relative to the installing section 12*a*, thereby disengaging the disks 6 from the gears 5.

The lock gear 5 and the horizontal rod 10 with the disk 6 for each arm, together with the vertical rod 8, generally constitutes a means for fixing the arm in a horizontal position.

A pad 15 is connected to the carriage 2 above the arms installing section 2*a*. When a door of an automobile supported by the arms 3 and 3' is opened, the door does not go against the post, but may contact with the pad 15. Thus the door is not damaged.

In use, when the carriage 2 has been lowered to its lowest position, the vertical rod 8 is moved upwardly relative to the installing section 12*a*, thereby disengaging the disks 6 from the gears 5. Thus, the swing arms 3 and 3' may be swung in a horizontal plane. Then, the arms are adjusted in their horizontal positions and lengths in such a manner that the arms can support an automobile to be repaired, in an appropriate and reliable manner. The carriage 2 is raised to lift the automobile. When the carriage is raised, the bolt 12 is raised out of contact with the floor 13 and the vertical rod 8 is moved downwardly, relative to the installing section 12*a*, by the spring 9, thereby causing the disks 6 to engage the gears 5. The arms are thus fixed in their horizontal positions. If the arms lifted are to be unfixed for any reason, the lever 14 may be inclined, in a direction indicated by an arrow of FIG. 3, to disengage the disks 6 from the gears 5.

According to the invention, the arms installing section 12*a* is located not at the inner opposed sides of the two posts, but at the front parts of the posts, or their sides from which an automobile is driven into the system. No object projects directly from the opposed sides of the posts. Also, the lock gears 5, the disks 6 which engage the gears, and the links 11 are all disposed in the arms installing section 12. Therefore, a door of the automobile supported and lifted by the arms may be opened until it contacts the pad 15 located above the installing section 12*a*. This allows efficient repair work of the inside of the automobile. Also, when the arms are lifted, they are automatically and reliably fixed in their horizontal positions. Safe repair work is thus ensured. Moreover, the lever 14 is located in proximity to the outer side of the post. This facilitates an easy repair work of the inside of the automobile. Also, since the lever 14 is within easy reach, the operator may operate it easily while standing on the outside of the system.

If desired, the system of the invention may be modified in such a manner that the vertical rod 8 is moved upwardly relative to the installing section 12*a* not by the bolt 8 making contact with the floor 13, but by the lower end of the rod 8 making contact with a base of the post or by horizontal opposed projections from the rod 8 and from the post 1 making contact with each other. Also, if desired, the lever 14 may be so mounted that it directly raises the vertical rod 8.

What is claimed is:

1. A system for lifting an automobile for repair thereof, comprising (a) a pair of posts having opposed sides and each having a horizontal cross section and a vertical inner space which is open in a direction parallel to a direction from which an automobile is driven into the system, (b) a vertically movable carriage provided in the inner space of each said post, (c) an arms installing section projecting from said carriage in the same direction as the inner space of the post is open, (d) a pair of horizontal swing arms each connected, at an inner end thereof, to a vertical pivot extending in said installing section and having a car body support at an outer end thereof, each said swing arm being horizontally movable about said pivot, (e) a device for fixing said swing arms in horizontal positions, including (i) a lock gear connected to the inner end of each said swing arm and located in said installing section, said lock gear having an arcuate toothed wall which is concentric with said pivot, (ii) a means for engaging said toothed wall of said gear while making right angles with an imaginary surface tangent to the arc of the toothed wall of the gear, said means being located in said installing section, (iii) a vertical rod extending through a mount connected to said installing section, said rod being vertically movable relative to said mount and urged in a downward direction, (iv) said means for engaging and said vertical rod being linked together, and (v) said means for engaging normally engaging said lock gear, (f) a means connected to said vertical rod for engaging a fixed object immediately before said carriage reaches its lowest position, so as to move the vertical rod upwardly relative to said mount, thereby causing simultaneous disengagements of said means for engaging and said lock gear for one of said swing arms and of said means for engaging and said lock gear for the other swing arm, and (g) a lever connected to a means which links said means for engaging for one of the swing arms to said vertical rod, said lever being adapted to allow manual disengagement of the means for engaging and the lock gears.

2. A system in accordance with claim 1 wherein said means connected to the vertical rod is a bolt connected to the lower end of said vertical rod.

* * * * *

UNITED STATES PATENT AND TRADEMARK OFFICE

CERTIFICATE OF CORRECTION

PATENT NO. : 4,825,977

DATED : 2 May 1989

INVENTOR(S) : Shunji Isogai

It is certified that error appears in the above-identified patent and that said Letters Patent is hereby corrected as shown below:

Title page:

In the Abstract, line 4, replace "having arms installing section" with --having an arms installing section--.

Signed and Sealed this

Seventeenth Day of April, 1990

*Attest:*

HARRY F. MANBECK, JR.

*Attesting Officer*

*Commissioner of Patents and Trademarks*